United States Patent
Um et al.

(10) Patent No.: US 12,458,678 B2
(45) Date of Patent: Nov. 4, 2025

(54) **COMPOSITION FOR PREVENTING OR TREATING PROSTATIC HYPERPLASIA COMPRISING MIXED EXTRACTS OF *CURCUMAE RADIX* AND *SYZYGII FLOS***

(71) Applicant: UNIVERSITY-INDUSTRY COOPERATION GROUP OF KYUNG HEE UNIVERSITY, Yongin-si (KR)

(72) Inventors: Jae-Young Um, Seoul (KR); Jinbong Park, Seoul (KR)

(73) Assignee: UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 966 days.

(21) Appl. No.: 17/423,706

(22) PCT Filed: Jan. 17, 2020

(86) PCT No.: PCT/KR2020/000857
§ 371 (c)(1),
(2) Date: Jul. 16, 2021

(87) PCT Pub. No.: WO2020/149694
PCT Pub. Date: Jul. 23, 2020

(65) Prior Publication Data
US 2022/0080021 A1    Mar. 17, 2022

(30) Foreign Application Priority Data

Jan. 17, 2019  (KR) .................. 10-2019-0006331

(51) Int. Cl.
*A61K 36/9066*  (2006.01)
*A61K 36/61*  (2006.01)
*A61P 13/08*  (2006.01)

(52) U.S. Cl.
CPC .......... *A61K 36/9066* (2013.01); *A61K 36/61* (2013.01); *A61P 13/08* (2018.01)

(58) Field of Classification Search
CPC ...... A61K 36/9066; A61K 36/61; A61P 13/08
See application file for complete search history.

(56) References Cited

FOREIGN PATENT DOCUMENTS

| CN | 107261062 A | * | 10/2017 | |
| DE | 0509268 A1 | * | 3/1992 | ............. A61K 36/61 |

(Continued)

OTHER PUBLICATIONS

Machine translation of CN-107261062-A from PE2E via FIT, 2017 (Year: 2017).*

(Continued)

*Primary Examiner* — Bethany P Barham
*Assistant Examiner* — Ayaan A Alam
(74) *Attorney, Agent, or Firm* — Sughrue Mion, PLLC

(57) ABSTRACT

The present invention relates to a pharmaceutical composition for preventing or treating benign prostatic hyperplasia, including mixed extracts of *Curcumae radix* and *Syzygii flos* as an effective component. The mixed extracts were found to inhibit the expression of dihydrotestosterone, androgen receptors, prostate-specific antigens, proliferating cell nuclear antigen (PCNA), cyclin B1, and nuclear factor kappa-light-chain-enhancer of activated B cells (NF-κB); and to have less adverse side effects compared to an existing benign prostatic hyperplasia drug, finasteride, and thus may be beneficially used for the prevention or treatment of benign prostatic hyperplasia.

3 Claims, 16 Drawing Sheets

(56) References Cited

FOREIGN PATENT DOCUMENTS

| JP | 2016-003225 A | 1/2016 |
| JP | 2018-108946 A | 7/2018 |
| KR | 10-0858224 B1 | 9/2008 |
| KR | 10-2015-0038775 A | 4/2015 |

OTHER PUBLICATIONS

Cortes-Rojas, Clove (Syzygium aromaticum): a precious spice, 2014, Asian Pacific Journal of Tropical Biomedicine, 4, 90-96 (Year: 2014).*
Zhou, Chinese medicinal herbs in treating model rats with hepatic fibrosis, 2010, Afr. J. Trad. CAM, 7, 104-108 (Year: 2010).*
Markakis, The Role of Eugenol in the Prevention of Acute Pancreatitis-Induced Acute Kidney Injury: Experimental Study, 2016, Hindawi Publishing Corporation, 1-9 (Year: 2016).*
Chikere, The effects of methanolic extract of *Syzygium aromaticum* (clove bud) on the histology of testis in adult male wistar rats, 2015, Journal of Natural Sciences Research, 5, 1-7 (Year: 2015).*
Machine translation of EP 0509268 A1 provided by PE2E via FIT, 1992 (Year: 1992).*
Zhou, Two Traditional Chinese Medicines Curcumae Radix and Curcumae Rhizoma: An Ethnopharmacology, Phytochemistry, and Pharmacology Review, 2016, Evidence-Based Complementary and Alternative Medicine, 2016, 1-30 (Year: 2016).*
International Search Report for PCT/KR2020/000857, dated Jun. 19, 2020.

\* cited by examiner

FIG.15
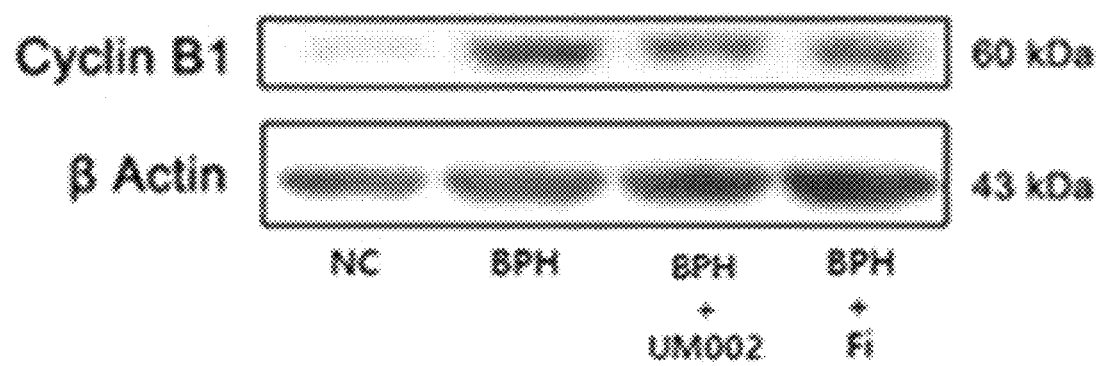
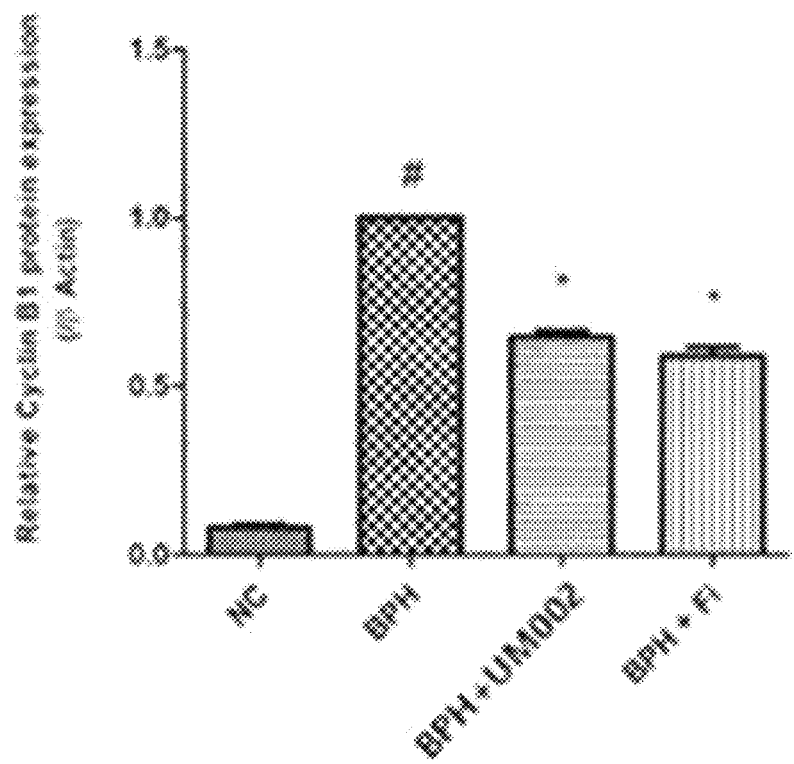
FIG. 16

COMPOSITION FOR PREVENTING OR TREATING PROSTATIC HYPERPLASIA COMPRISING MIXED EXTRACTS OF *CURCUMAE RADIX* AND *SYZYGII FLOS*

CROSS REFERENCE TO RELATED APPLICATIONS

This application is a National Stage of International Application No. PCT/KR2020/000857 filed Jan. 17, 2020, claiming priority based on Korean Patent Application No. 10-2019-0006331, filed Jan. 17, 2019, the entire disclosures of which are incorporated herein by reference.

TECHNICAL FIELD

The present invention relates to a composition for preventing or treating benign prostatic hyperplasia in which the composition includes a mixed extract of *Curcumae radix* and *Syzygii flos* as an active ingredient.

BACKGROUND ART

Benign prostatic hyperplasia (BPH) is defined as a condition in which the prostate is enlarged to block the urinary tract at the lower part of the bladder so as to reduce the flow of urine. However, currently, benign prostatic hyperplasia is defined as a complaint of lower urinary tract symptoms, which collectively refer to symptoms indicating bladder discharge disorders such as frequent urination (8 or more times/day), nocturia, urgency urination (strong and sudden urge to urinate), urinary incontinence (incontinence to urinate), delayed urination (delayed discharge of urine), interrupted urination (interruption of the flow of urine), and a phenomenon that requires force during urination in men over 50 years of age.

The most major triggers for the development of benign prostatic hyperplasia are age increase and male hormones. Histological enlargement of the prostate starts at the age of 35, in 60% of men in their 60 s and 90% of men in their 80 s. It is found that 50% of these patients complain urination difficulties due to enlarged prostate.

Drug treatment for benign prostatic hyperplasia is generally classified into alpha blockers and androgen inhibitors (5-alpha-reductase inhibitors). Alpha blockers are drugs that lower the pressure and tension of the prostatic urethra, and commercially available alpha blockers include terazosin, doxazosin, tamsulosin, alfuzosin, and the like. However, alpha blockers have been reported to have no effect on reducing the enlarged prostate so that they are only a temporary treatment method, and side effects such as dizziness, lethargy, headache, and visual field disturbance. Androgen inhibitors are drugs that prevent enlargement of the prostate by inhibiting 5-alpha-reductase, which plays a critical role in the process of enlargement of the prostate. 5-alpha-reductase inhibitors include finasteride, dutasteride, and the like, which are commercially available. However, it takes a long time for these drugs to take effect after taking them, and side effects related to sexual function have been reported. As described above, most of the drugs commercially available or under development so far exhibit various side effects, so that it is necessary to develop a therapeutic agent for benign prostatic hyperplasia with a new mechanism.

DISCLOSURE

Technical Problem

An object of the present invention is to provide a pharmaceutical composition for preventing or treating benign prostatic hyperplasia, the composition including a mixed extract of *Curcumae radix* and *Syzygii flos* as an active ingredient.

Another object of the present invention is to provide a health functional food for preventing or improving benign prostatic hyperplasia, the health functional food including a mixed extract of *Curcumae radix* and *Syzygii flos* as an active ingredient.

Still another object of the present invention is to provide a method for preventing or treating benign prostatic hyperplasia, the method including: administering to an individual a pharmaceutical composition for preventing or treating benign prostatic hyperplasia, the composition including a pharmaceutically effective amount of a mixed extract of *Curcumae radix* and *Syzygii flos* as an active ingredient.

Technical Solution

In order to achieve the object, the present invention provides a pharmaceutical composition for preventing or treating benign prostatic hyperplasia, the composition including a mixed extract of *Curcumae radix* and *Syzygii flos* as an active ingredient.

In one embodiment of the present invention, the mixed extract may be extracted after mixing *Curcumae radix* and *Syzygii flos* in a weight ratio of 0.1 to 10:0.1 to 10, preferably 1:1.

In one embodiment of the present invention, the mixed extract may inhibit the expression level of one or more factors selected from the group consisting of dihydrotestosterone, androgen receptor, prostate specific antigen, estrogen receptor α, proliferating cell nuclear antigen (PCNA), cyclin B1 and nuclear factor kappa B (nuclear factor kappa-light-chain-enhancer of activated B cells, NF-κB).

In one embodiment of the present invention, the mixed extract may not increase the expression of alanine transaminase (AST), a liver toxin factor, and creatinine.

In one embodiment of the present invention, the mixed extract may not reduce the sperm count in the epididymis.

Further, the present invention provides a food composition for preventing or improving benign prostatic hyperplasia, the composition including a mixed extract of *Curcumae radix* and *Syzygii flos* as an active ingredient.

Further, the present invention provides a method for preventing or treating benign prostatic hyperplasia, the method including: administering to an individual a pharmaceutical composition for preventing or treating benign prostatic hyperplasia, the composition including a pharmaceutically effective amount of a mixed extract of *Curcumae radix* and *Syzygii flos* as an active ingredient.

Advantageous Effects

It is confirmed that although the mixed extract of *Curcumae radix* and *Syzygii flos* in an opposite relationship according to the present invention is used, it effectively inhibits dihydrotestosterone, androgen receptor, prostate specific antigen, estrogen receptor α, proliferating cell nuclear antigen (PCNA), cyclin B1 and nuclear factor kappa B (nuclear factor kappa-light-chain-enhancer of activated B cells, NF-κB), which are factors related to benign prostatic hyperplasia, to cause a synergistic effect. Further, it is confirmed that the present invention has a lower expression of hepatotoxin factor than finasteride which is a conventionally used treatment for benign prostatic hyperplasia, dose not affect the sperm count, and has the effect of alleviating the side effects and toxicity of finasteride. Therefore, the mixed extract of *Curcumae radix* and *Syzygii flos* of the present invention exhibits an effective therapeutic effect as a therapeutic agent for benign prostatic hyperplasia and thus may be usefully applied to related industries.

DESCRIPTION OF DRAWINGS

FIG. 3A: histomorphological changes of prostate cells; FIG. 3B: comparison of prostate epithelial cell thickness).

FIG. 15 illustrates the results of comparing the expression levels of cyclin B1 in the prostate tissue of the group injected with extracts of *Curcumae radix* and *Syzygii flos* and the group injected with finasteride through Western blot (NC group: normal control group; BPH group: disease control group; BPH+UM-002 group: experimental group injected with mixed extracts of *Curcumae radix* and *Syzygii Flos*; and BPH+Fi group: positive control group).

FIG. 16 illustrates the results of comparing the expression levels of liver toxin factors (AST and creatinine) in the prostate tissue of the group injected with extracts of *Curcumae radix* and *Syzygii flos* and the group injected with finasteride through Western blot (NC group: normal control group; BPH group: disease control group; BPH+CR group: experimental group injected with extracts of *Curcumae radix* alone; BPH+SF group: experimental group injected with extracts of *Syzygii flos* alone; and BPH+UM-002 group: experimental group injected with mixed extracts of *Curcumae radix* and *Syzygii flos*).

MODES OF THE INVENTION

The present invention provides a pharmaceutical composition for preventing or treating benign prostatic hyperplasia, the composition including a mixed extract of *Curcumae radix* and *Syzygii flos* as an active ingredient.

Figure 1:
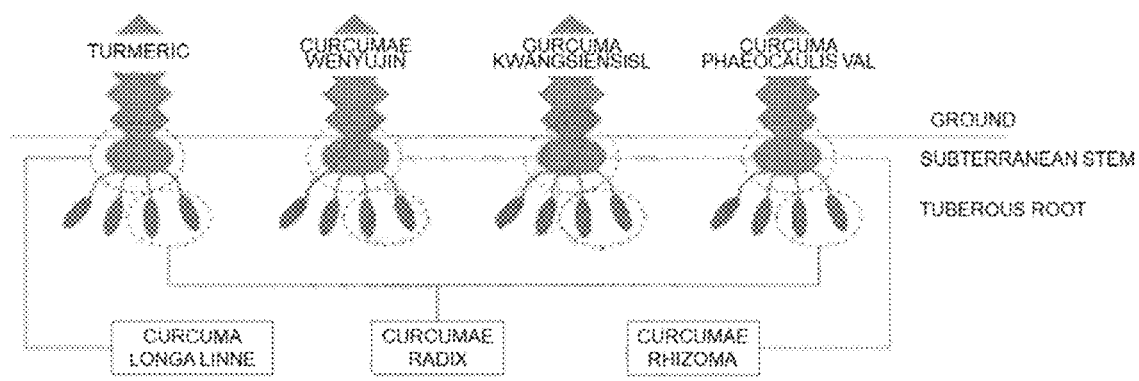
FIG. 1 illustrates the difference between the plant origin and the medicinal site of *Curcumae radix* used in the present invention.

In the present invention, the *Curcumae radix* is the tuber root of *Curcumae wenyujin, Curcumae linga linne, Curcumae kwangsiensis* and *Curcumae phaeocaulis val*, which is steamed and dried as it is or after removing the bark (see FIG. 1).

In the present invention, the *Syzygii flos* is a drug opposite to *Curcumae radix*, and is a drug generated by drying flower buds of the *Syzygii flos* family (Myrtaceae).

The term "opposite" drug as used in the present invention is two different drugs that may weaken drug efficacy or cause side effects. As stated in the article of the Pharmaceutical Methods of Donguibogam, it is stated, "cannot use the 'reducing the efficacy of' or 'opposite' medicines." They refer to medicines that require caution when using them together.

In the present invention, *Curcumae radix* and *Syzygii flos* may be mixed in a weight ratio of 0.1 to 10:0.1 to 10, preferably be mixed and used in a weight ratio of 1:1.

In the present invention, the extraction solvent may be water, alcohol, or a mixture thereof. C1 to C2 lower alcohol may be used as the alcohol, and 30% ethanol, 50% ethanol, 70% ethanol or methanol may be used as the lower alcohol. The extraction method may be selected from the group consisting of reduced pressure high temperature extraction, boiling water extraction, reflux extraction, hot water extraction, cold extraction, room temperature extraction, ultrasonic extraction and steam extraction, but is not limited thereto. The extraction solvent may be added in 1 to 10 times the amount of *Curcumae radix* and *Syzygii flos* for extraction. The extraction temperature may be 30° C. to 100° C., but is not limited thereto. In addition, the extraction time may be 2 hours to 48 hours, but is not limited thereto.

In the present invention, the reduced pressure concentration of the extract may be using a vacuum reduced pressure concentrator or a vacuum rotary evaporator, and the drying may be reduced pressure drying, vacuum drying, boiling drying, spray drying or freeze-drying.

The pharmaceutical composition of the present invention may be preferably formulated as a pharmaceutical composition by including one or more pharmaceutically acceptable carriers in addition to the active ingredient for administration. When formulated in the form of a liquid solution, as it is sterile and biocompatible, saline, sterile water, Ringer's solution, buffered saline, albumin injection solution, dextrose solution, maltodextrin solution, glycerol, ethanol, or a mixture thereof may be used as a carrier. If necessary, other conventional additives such as antioxidants, buffers, and bacteriostats may be added. Diluents, dispersants, surfactants, binders and lubricants may be additionally added to form an injectable formulation such as an aqueous solution, suspension, or emulsion, pill, capsule, granule or tablet.

In addition, the formulation and pharmaceutically acceptable carrier of the pharmaceutical composition of the present invention are not particularly limited, and may be appropriately selected according to known techniques in the art. In addition, the effective amount for the treatment or prevention of various immune-related diseases may be adjusted according to various factors including the type of disease, the severity of the disease, the type and content of active ingredients and other ingredients contained in the composition, the type of formulation, the age, weight, general health condition, gender and diet of patient, administration time, administration route, secretion rate of the composition, duration of treatment, and concurrently used drugs. The daily dose is 0.0001 to 100 mg/kg, preferably 0.01 to 100 mg/kg, based on the amount of the mixed extract of the present invention, and may be administered 1 to 6 times a day. However, it is apparent to those skilled in the art that the dose or dosage of each active ingredient should be such an extent that the content of each active ingredient is not too high to cause side effects.

The pharmaceutical composition of the present invention may be administered to mammals such as rats, mice, livestock, and humans by various routes. Administration may be performed by any mode, for example, orally, rectally, or intravenous, intramuscular, subcutaneous, intrauterine or intracerebroventricular injection.

Further, the present invention provides a food composition for preventing or improving benign prostatic hyperplasia, the composition including a mixed extract of *Curcumae radix* and *Syzygii flos* as an active ingredient.

The food composition of the present invention may include various flavoring agents or natural carbohydrates as additional ingredients like a conventional food composition in addition to including the extract as an active ingredient.

Examples of the above-mentioned natural carbohydrates include monosaccharides such as glucose, and fructose; disaccharides such as maltose, and sucrose; and polysaccharides such as conventional sugars such as dextrin and cyclodextrin, and sugar alcohols such as xylitol, sorbitol, and erythritol. The above-mentioned flavoring agents may advantageously use natural flavoring agents (taumatin), stevia extracts (for example, rebaudioside A, glycyrrhizin, etc.) and synthetic flavoring agents (saccharin, aspartame, etc.). The food composition of the present invention may be formulated in the same manner as the pharmaceutical composition and used as a functional food or added to various foods. Foods to which the composition of the present invention can be added include, for example, beverages, meat, chocolate, foods, confectionery, pizza, ramen, other noodles, gums, candy, ice cream, alcoholic beverages, vitamin complexes, health supplements, and the like.

In addition, the food composition may include various nutrients, vitamins, minerals (electrolytes), flavoring agents such as synthetic flavoring agents and natural flavoring agents, colorants, thickeners (cheese, chocolate, etc.), pectic acid and its salts, alginic acid and its salts, organic acids, protective colloidal thickeners, pH adjusters, stabilizers, preservatives, glycerin, alcohols, carbonation agents used in carbonated beverages, and the like in addition to the extract as an active ingredient. In addition, the food composition of the present invention may include natural fruit juice and pulp for the production of fruit juice beverages and vegetable beverages.

The functional food composition of the present invention may be manufactured and processed in the form of tablets, capsules, powders, granules, liquids, pills, and the like. In the present invention, the term 'health functional food composition' refers to a food manufactured and processed using raw materials or ingredients with functionality useful for the human body according to Act No. 6727 of the Health Functional Food Act and refers to ingestion for the purpose of obtaining useful effects for health purposes such as regulating nutrients or physiological effects for the structure and function of the human body. The health functional food of the present invention may include conventional food additives. Unless otherwise specified, whether it is suitable as a food additive is determined according to the criteria and standards related to the item according to the general rules and general test method of the Korea Food Additives Code approved by the Ministry of Food and Drug Safety. The items listed in the "Food Additives Code" include, for example, chemical compounds such as ketones, glycine, calcium citrate, nicotinic acid, and cinnamic acid; natural additives such as persimmon pigment, licorice extract, crystalline cellulose, high pigment, and guar gum; mixed preparations such as a sodium L-glutamate preparation, an alkali additive for noodles, a preservative preparation, and a tar dye preparation. For example, the health functional food in the form of tablets is prepared such that the active ingredient of the present invention is mixed with excipients, binders, disintegrants and other additives, the mixture is granulated by a conventional method followed by compression molding with a lubricant, etc. or the mixture may be compression molded directly. In addition, the health functional food in the form of tablets may contain a flavoring agent or the like, if necessary. Among health functional foods in the form of capsules, hard capsules may be prepared by filling a mixture of the active ingredient of the present invention with additives such as excipients in conventional hard capsules. Soft capsules may be prepared by filling a mixture of the active ingredient of the present invention with additives such as excipients in a capsule base such as gelatin. The soft capsules may include plasticizers such as glycerin or sorbitol, colorants, a preservative, and the like, if necessary. The health functional food in the form of pills may be prepared by molding a mixture of the active ingredient of the present invention with excipients, binders, disintegrants, etc. by a known method, if necessary. In addition, it may be coated with sucrose or other coating agent, if necessary. Further, the surface thereof may be coated with a material such as starch or talc. The health functional food in the form of granules may be prepared in granular form by mixing a mixture of the active ingredient of the present invention with excipients, binders, disintegrants, etc. by a conventionally known method. It may include fragrance ingredients, flavoring agents, etc., if necessary.

Further, the present invention provides a method for preventing or treating benign prostatic hyperplasia, the method including: administering to an individual a pharmaceutical composition for preventing or treating benign prostatic hyperplasia, the composition including a pharmaceutically effective amount of a mixed extract of *Curcumae radix* and *Syzygii flos* as an active ingredient.

The pharmaceutical composition of the present invention is administered in a therapeutically effective amount or in a pharmaceutically effective amount. The term "pharmaceutically effective amount" means an amount sufficient to treat a disease with a reasonable benefit/risk ratio applicable to medical treatment, and the effective dose level may be determined according to factors including the type, severity, age, and gender of the subject, activity of the drug, sensitivity to the drug, administration time, administration route, excretion rate, duration of treatment, concurrent drugs, and other factors well known in the medical field.

Hereinafter, the present invention is described in more detail through Examples. These Examples are for explaining the present invention in more detail, and the scope of the present invention is not limited to these Examples.

Example 1. Experimental Method 1.1. Preparation of Mixed Extracts and Reagents Used

*Curcumae radix* and *Syzygii flos* were mixed in a weight ratio of 1:1 and extracted to produce herbal medicine complex containing *Curcumae radix* and *Syzygii flos*. Specifically, the drug containing 250 g of *Syzygii flos* and 250 g of *Curcumae radix* was trimmed and washed, then put in 1 L of distilled water and then extracted at 100° C. for 2 hours to obtain 500 ml of extract. The extract solution was freeze-dried to obtain a powder. The dried powder was dissolved in tertiary distilled water, filtered through a 22 μm filter, and used in the experiment. The mixed extract (hereinafter, referred to as "UM-002") was orally administered to a rat, an experimental animal, at a concentration of 50 mg/kg.

In addition, testosterone propionate (TP), which induces benign prostatic hyperplasia, was purchased from Wako pure chemical industries (Osaka, Japan), and finasteride (Fi) (≥97% pure) used as a positive control was purchased from Sigma-Aldrich Inc. (MO, USA). AR, ERα, PSA, PCNA, cyclin B1, and Nf-κB antibodies were purchased from Santa cruz (Calif., USA).

1.2. Experimental Animal

For the benign prostatic hyperplasia animal model, 12-week-old male Sprague-Dawley (SD) rats (200±20 g) were purchased and tested from Daehan Biolink (Eumseong, Korea). After an acclimatization period for 1 week before the start of the experiment, feed and water were freely ingested for 6 weeks during the experiment. In an environment in which the light was controlled at intervals of 12 hours, the indoor temperature was 23±2° C., and the humidity was maintained at 70%.

To induce benign prostatic hyperplasia, rats were divided into four groups, and six animals were randomly assigned to each group. Three groups among them were injected with TP (5 mg/kg/day) into the groin for 4 weeks, and one group, a normal control group, was injected with the same amount of ethanol. After induction of benign prostatic hyperplasia for 4 weeks, the experiment was performed by various treatment as follows: (i) a normal control group injected with ethanol for an additional four weeks (NC group); (ii) a disease control group injected with TP for an additional four weeks (benign prostatic hyperplasia, BPH group); (iii) an experimental group injected with TP along with mixed extracts (UM-002, 50 mg/kg/day) for an additional four weeks (BPH+UM-002 group); and (iv) a positive control group injected with TP along with finasteride (1 mg/kg/day) for an additional four weeks (BPH+Fi group).

1.3. Prostate Index Measurement Through Tissue Weight Measurement and Weight Correction In order to confirm the induction of benign prostatic hyperplasia and the improvement effect of the mixed extract (UM-002), the volume and weight of prostate tissue in rats were measured after a total of 8 weeks of experimentation. In addition, in order to correct the difference in tissue weight according to body weight, the prostate index was calculated by dividing the weight of the prostate in mg with respect to 100 g of body weight.

1.4. H&E (Hematoxylin & Eosin) Staining

Prostate samples fixed in paraffin were cut to a thickness of 4 μm. The sections were deparaffinized with xylene and subsequently reduced with alcohol. Tissue sections were treated in 150 µl of 0.1% trypsin working solution (composition: trypsin 0.4 ml, calcium 0.01 g, chloride 0.01 g in D.W. 7 ml) for 15 minutes, and then blocked using fetal bovine serum (FBS). For H&E staining, the cut tissue was immersed in hematoxylin solution for 5 minutes, distilled water for 5 minutes, and eosin solution for 30 seconds, and then dried and fixed. The slides were observed using an Olympus IX71 Research Inverted Phase microscope (Olympus Co., Tokyo, Japan), and the density was measured using ImageJ 1.47v software (National Institute of Health, MD, USA).

1.5. Western Blotting

The prepared prostate tissue was chopped and homogenized with a Bullet Blender homogenization kit (Next Advance Inc., NY, USA). After the homogenized tissue was dissolved in RIPA buffer, it was centrifuged at 13,000 rpm at 4° C. for 20 minutes to remove insoluble substances. The total concentration of the extracted protein was measured by the method of Bradford. The extracted protein was separated by 8% sodium dodecyl sulfate-polyacrylamide gel electrophoresis, and then transferred to a polyvinylidenedifluoride (PVDF) membrane. After blocking the PVDF membrane in 10 mM Tris, 150 mM NaCl, and 0.05% Tween-20 (TBST) (pH 7.6) containing 5% skim milk for 1 hour at room temperature, the membrane was washed with TBST, and incubated overnight at 4° C. in suitable primary antibodies (PSA, AR, ERα, PCNA, cyclin B1, NF-κb). Protein blots were subsequently incubated in horseradish peroxidase (HRP)-conjugated affinipure Goat anti-rabbit IgG (Jackson Immunoresearch lab., PA, USA) or HRP-conjugated affinipure Goat anti-mouse IgG (Jackson Immunoresearch lab., PA, USA). PVDF membrane was purchased from Millipore (MA, USA), and protein analysis reagent was purchased from Bio-Rad (CA, USA). The chemiluminescence intensity of the protein signal was quantified with ImageJ 1.47v software (National Institute of Health, MD, USA).

1.6. Serum Analysis and Dihydrotestosterone (DHT) Assay

The analysis of serum alanine transaminase (AST) and creatinine was requested to Seoul Medical Institute (Seoul Clinical Laboratories. Seoul, South Korea). Serum dihydrotestosterone (DHT) levels were analyzed using a DHT ELISA kit according to the manufacturer's instructions (SunLong Biotech Co., Hangzhou, China). Briefly, standard samples and rat plasma samples were added to DHT-antibody-precoated Micro Elisa strip plates, subsequently added with HRP-conjugated antibody. OD values were measured at 450 nm with a VERS Amax microplate reader (Molecular Devices LLC, Sunnyvale, CA, USA).

1.7. Analysis of Sperm Count in Epididymis

After excision of cauda epididymis from serum SD rats, it was cut into small pieces twice. Then, they were immersed in 4 ml of PBS for 1 hour to cause the sperm to spread into the PBS solution. After mixing PBS containing sperm with the same amount of methanol, they were observed using a hematocytometer and an Olympus IX71 Research Inverted Phase microscope (Olympus Co., Tokyo, Japan).

Figure 2:
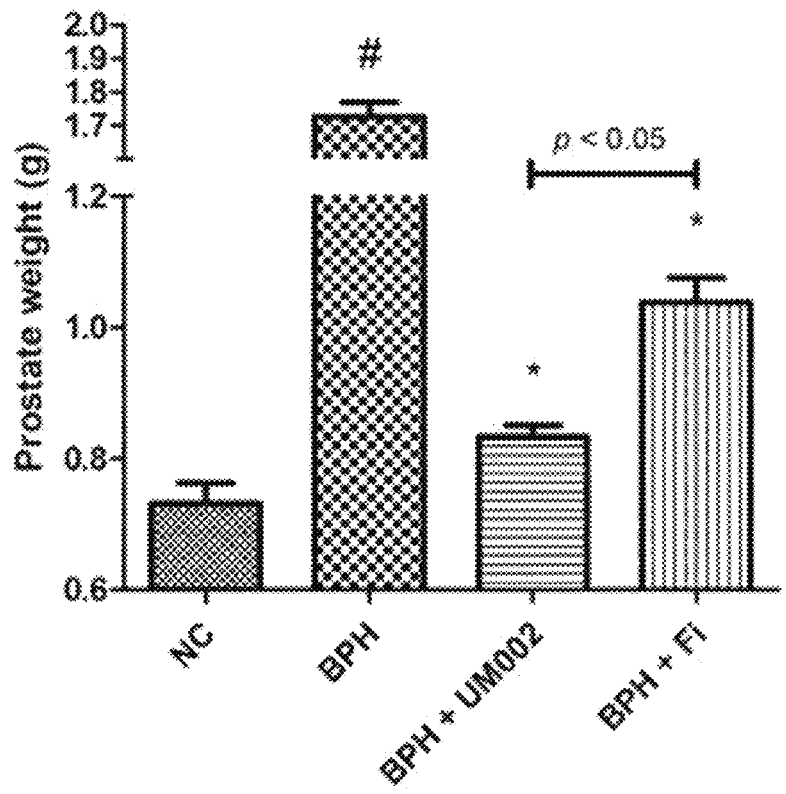
FIG. 2 illustrates the prostate index results corrected for the weight of the prostate tissue and the weight of the prostate tissue with respect to the body weight in each group (NC group: normal control group; BPH group: disease control group; BPH+UM-002 group: experimental group injected with mixed extracts of *Curcumae radix* and *Syzygii flos*; and BPH+Fi group: positive control group).
Figure 2:
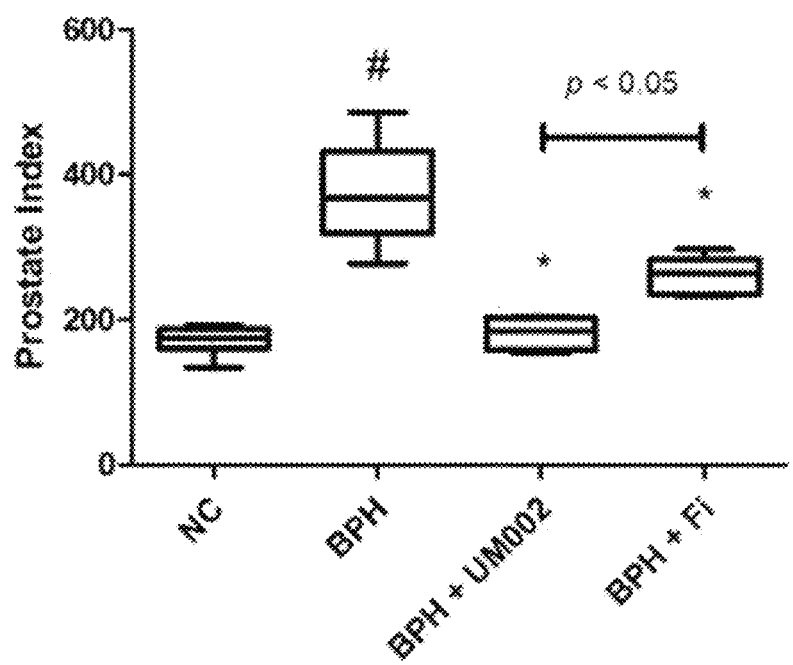

Example 2. Inhibitory Effect on Prostate Tissue Hypertrophy by the Mixed Extract The present inventors performed an experiment to confirm whether the mixed extract consisting of *Curcumae radix* and *Syzygii flos* had an inhibitory effect on prostate tissue hypertrophy. As a result of measuring the weight of prostate tissue (FIG. 2, upper panel), the average total prostate weight was 1.73 g in the BPH group, which was significantly increased by 236% compared to the average weight of 0.73 g in the NC group. Further, the average prostate weight of the experimental group (BPH+UM-002 group) was 0.83 g, which was 48% lower than that of the BPH group, and the positive control group (BPH+Fi) had an average weight of 0.93 g, which was 54% lower than that of the BPH group.

The prostate index result (FIG. 2, lower panel) corrected for the weight of the prostate tissue with respect to body weight was checked. It was confirmed that compared to the benign prostatic hyperplasia-induced disease control group (BPH group, prostate index=374.6), the hypertrophy of prostatic tissue in the experimental group treated with the mixed extract (BPH+UM-002 group) was significantly inhibited to 195.3, which is similar to that of the normal control group (NC group, prostate index=171.6), which was a 48% decrease compared to the BPH group, and the prostate index of positive control group injected with finasteride (BPH+Fi group) was 253.6, which was the 33% decrease compared to the BPH group and the experimental group inhibited prostate enlargement more significantly than BPH+Fi group.

Therefore, it was confirmed that the mixed extract consisting of *Curcumae radix* and *Syzygii flos* was effective in preventing or treating benign prostatic hyperplasia.

Example 3. Results of Histological Changes in Prostate Tissue by Mixed Extract

Figure 3A:
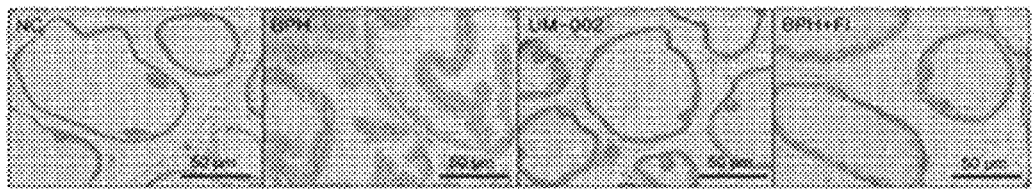
FIGS. 3A and 3B illustrate the results of H&E staining and prostate epithelial cell thickness in the prostate tissue in each group (NC group: normal control group; BPH group: disease control group; UM-002 group: experimental group injected with mixed extracts of *Curcumae radix* and *Syzygii flos*; and BPH+Fi group: positive control group.

The present inventors performed an experiment to observe the histological changes in the prostate tissue, thereby confirming the therapeutic effect of benign prostatic hyperplasia on the mixed extract. As a result of H&E staining of prostate tissue, it was confirmed that compared to the benign prostatic hyperplasia-induced disease control group (BPH group), the experimental group treated with the mixed extract consisting of *Curcumae radix* and *Syzygii flos* (BPH+UM-002 group) inhibited histological changes in the prostate tissue, such as the epithelial cell thickening and lumen reduction induced by testosterone propionate (TP), at a level similar to that of the normal control group (NC group) or the positive control group (BPH+Fi group) (See FIG. 3A).

Figure 3B:
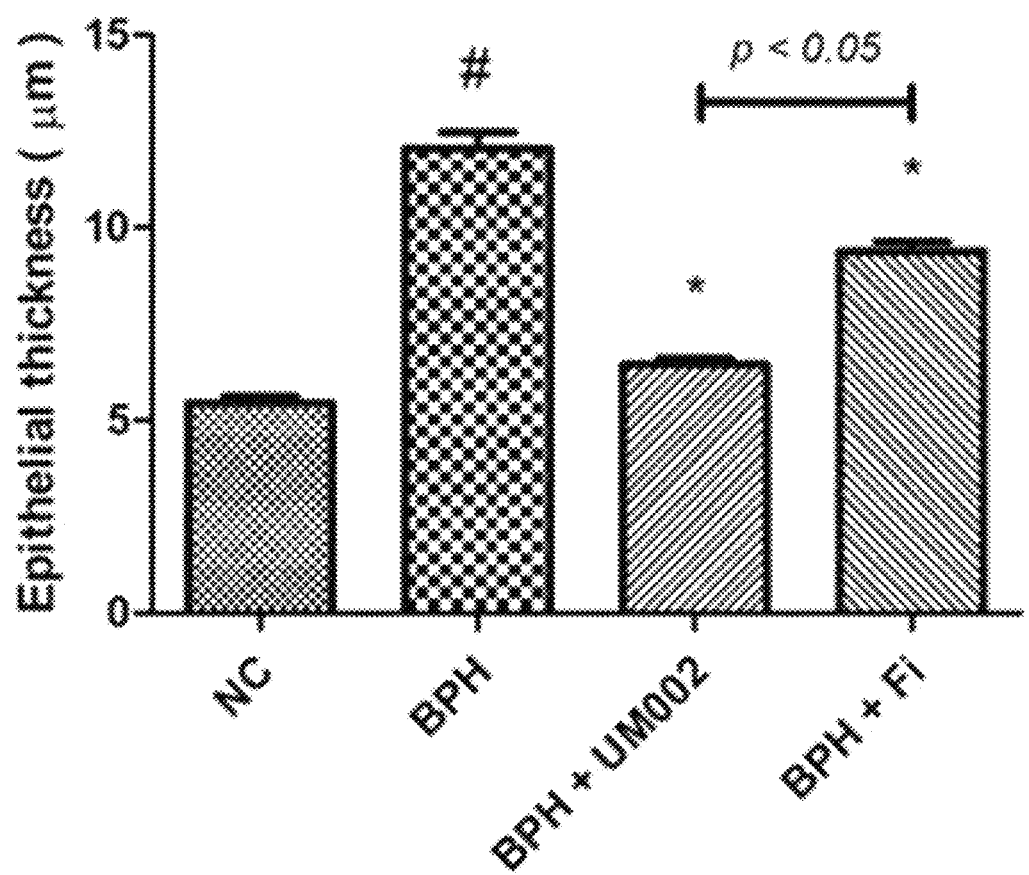

The thickness of prostate epithelial cells in the disease control group was 9.68 µm in the normal control group (NC group) and 12.06 µm in the BPH group. The experimental group (BPH+UM-002 group) had 6.45 µm, which was reduced by 46% compared to the BPH group, and the positive control group (BPH+Fi group) had 9.38 µm, which was inhibited by 22% compared the BPH group (See FIG. 3B).

Therefore, it was confirmed that the mixed extract consisting of *Curcumae radix* and *Syzygii flos* was effective in preventing or treating benign prostatic hyperplasia by histological changes in prostate tissue.

Figure 4:
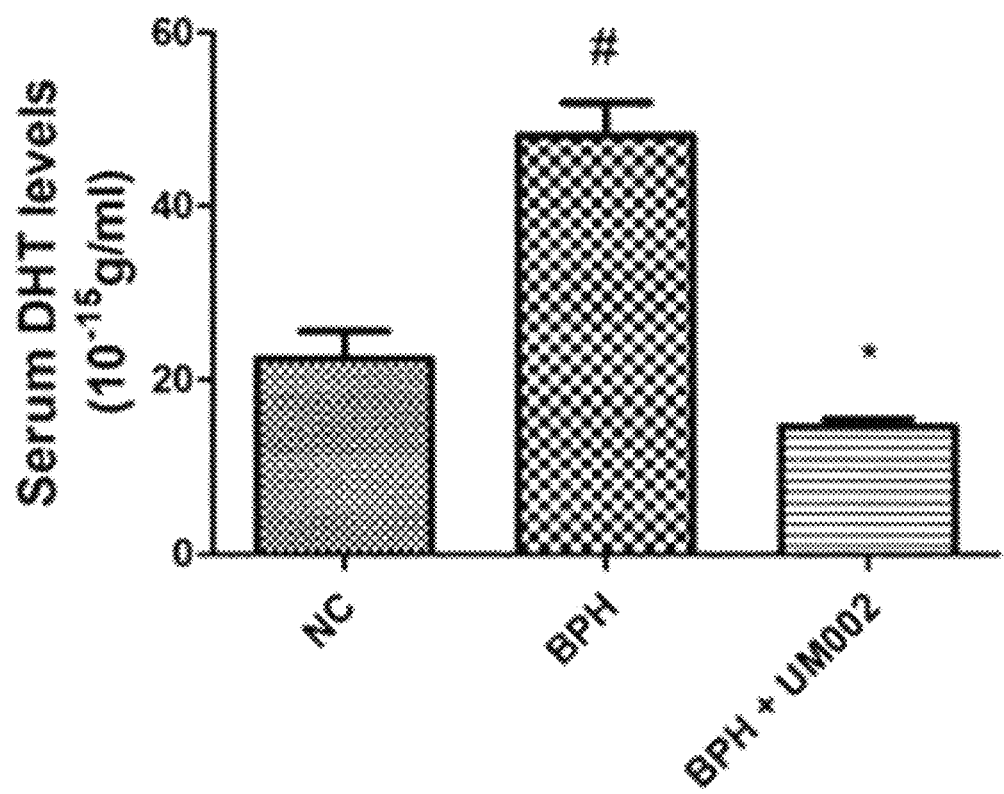
FIG. 4 illustrates the results of measuring the expression level of dihydrotestosterone (DHT) in the prostate tissue of each group through ELISA (NC group: normal control group; BPH group: disease control group; BPH+UM-002 group: experimental group injected with mixed extracts of *Curcumae radix* and *Syzygii flos*).

Example 4. Effect of Inhibiting Dihydrotestosterone (DHT) Expression in Prostate Tissue by Mixed Extract The present inventors performed an experiment to confirm whether the mixed extract consisting of *Curcumae radix* and *Syzygii flos* inhibits the expression of dihydrotestosterone (DHT), which plays a key role in the process of hypertrophy of the prostate tissue. As a result, the increased dihydrotestosterone level in the serum in the benign prostatic hyperplasia-induced disease control group (BPH group) was 1.94 times higher than that of the normal control group (NC group), and the expression level of DTH of the experimental group treated with the mixed extract (BPH+UM-002 group) was inhibited by 71% compared to that of the BPH group, and the level of DHT in the serum was 28% (See FIG. 4).

Therefore, it was confirmed that the mixed extract consisting of *Curcumae radix* and *Syzygii flos* was effective in preventing or treating benign prostatic hyperplasia by inhibiting the expression of dihydrotestosterone.

Figure 5:
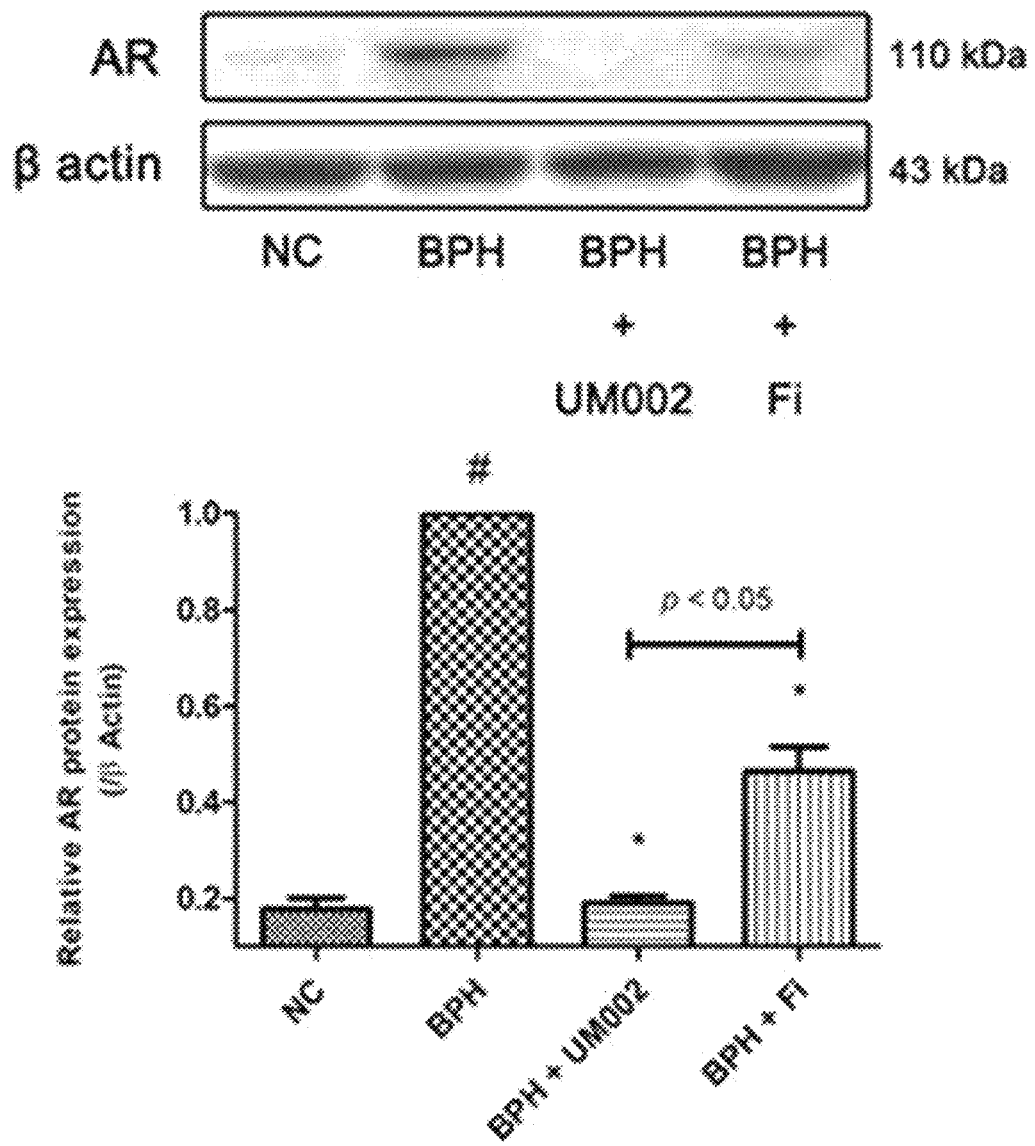
FIG. 5 illustrates the results of measuring the expression level of androgen receptor (AR) in the prostate tissue of each group through Western blot (NC group: normal control group; BPH group: disease control group; BPH+UM-002 group: experimental group injected with mixed extracts of *Curcumae radix* and *Syzygii Flos*; and BPH+Fi group: positive control group).

Example 5. Effect of Inhibiting Androgen Receptor (AR) Expression in Prostate Tissue by Mixed Extract The present inventors performed an experiment to confirm whether the mixed extract consisting of *Curcumae radix* and *Syzygii flos* inhibits the expression of androgen receptor (AR), which plays a key role in the process of hypertrophy of the prostate tissue. As a result, the increased androgen receptor expression level in the benign prostatic hyperplasia-induced disease control group (BPH group) was 5.22 times higher than that of the normal control group (NC group), and the experimental group treated with the mixed extract (BPH+UM-002 group) had 0.57 times, which was significantly inhibited compared to that of the positive control group (BPH+Fi group) (FIG. 5).

Therefore, it was confirmed that the mixed extract consisting of *Curcumae radix* and *Syzygii flos* was effective in preventing or treating benign prostatic hyperplasia by inhibiting the expression of androgen receptor.

Figure 6:
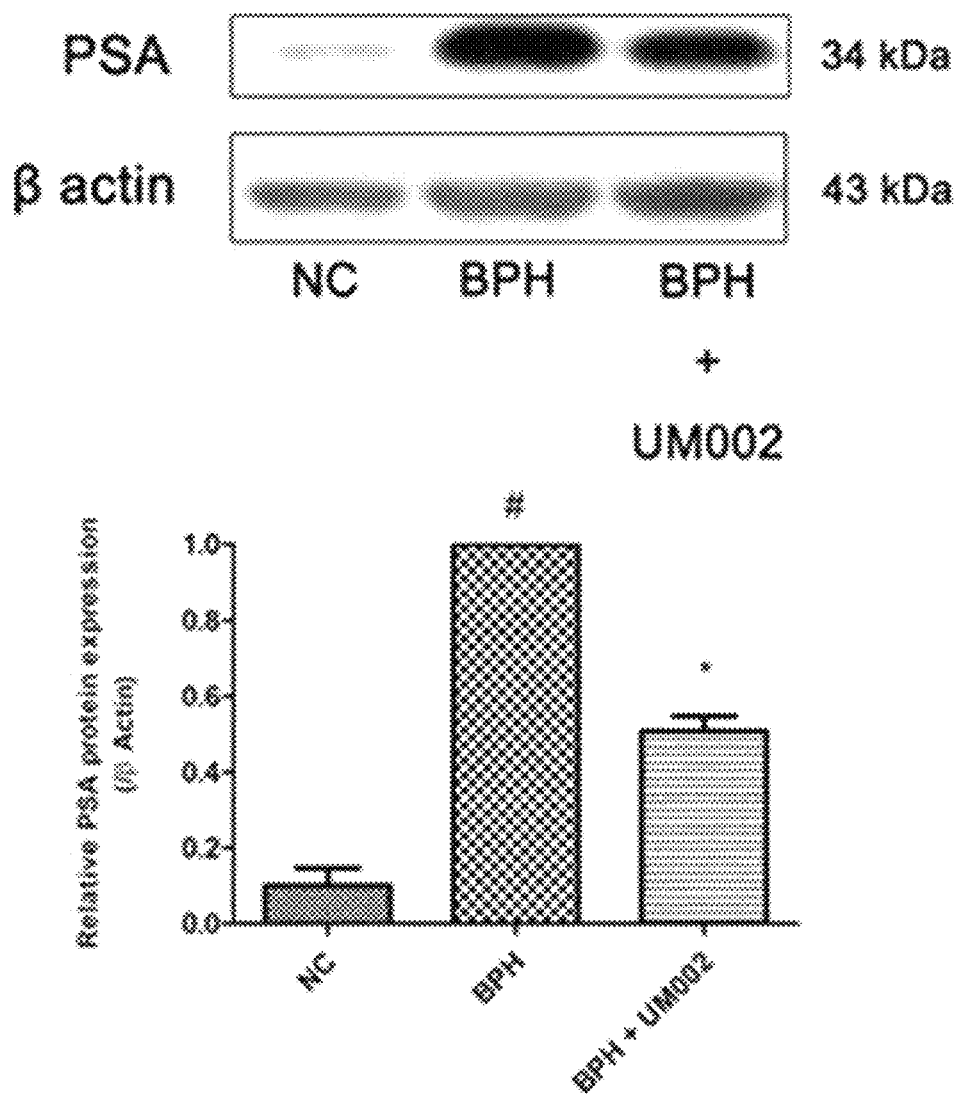
FIG. 6 illustrates the results of measuring the expression level of prostate specific antigen (PSA) in the prostate tissue of each group through Western blot (NC group: normal control group; BPH group: disease control group; and BPH+UM-002 group: experimental group injected with mixed extracts of *Curcumae radix* and *Syzygii flos*).

Example 6. Effect of Inhibiting Prostate Specific Antigen (PSA) Expression in Prostate Tissue by Mixed Extract The present inventors performed an experiment to confirm whether the mixed extract consisting of *Curcumae radix* and *Syzygii flos* inhibits the expression of prostate specific antigen (PSA), which plays a key role in the process of hypertrophy of the prostate tissue. As a result, it was confirmed that assuming that PSA expression level was taken as 100% standard, the increased prostate specific antigen (PSA) expression level in the experimental group treated with the mixed extract (BPH+UM-002 group) was inhibited by 58% than the benign prostatic hyperplasia-induced disease control group (BPH group) (FIG. 6).

Therefore, it was confirmed that the mixed extract consisting of *Curcumae radix* and *Syzygii flos* was effective in preventing or treating benign prostatic hyperplasia by inhibiting the expression of prostate specific antigen.

Figure 7:
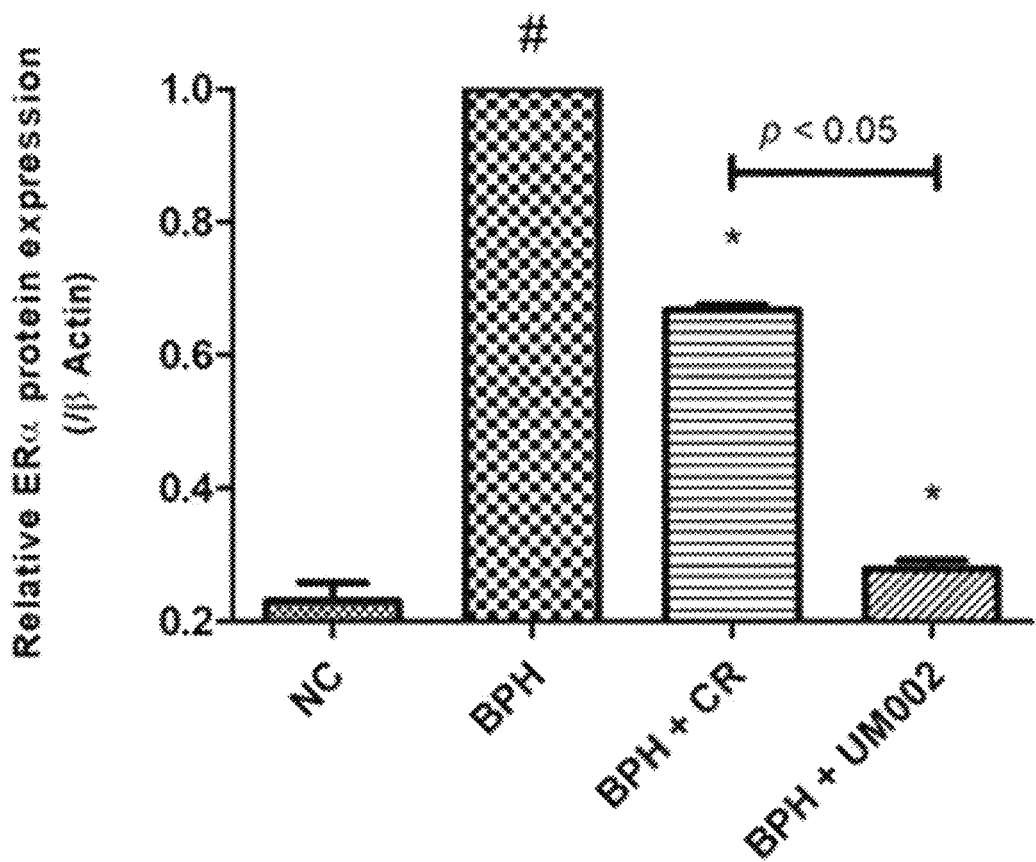
FIG. 7 illustrates the results of measuring the expression level of estrogen receptor α (ERα) in the prostate tissue of each group through Western blot (NC group: normal control group; BPH group: disease control group; CR Group: experimental group injected with extracts of *Curcumae radix* alone; and BPH+UM-002 Group: experimental group injected with mixed extracts of *Curcumae radix* and *Syzygii flos*).

Example 7. Effect of Inhibiting Estrogen Receptor α (ERα) Expression in Prostate Tissue by Mixed Extract The present inventors performed an experiment to confirm whether the mixed extract consisting of *Curcumae radix* and *Syzygii flos* inhibits the expression of estrogen receptor α (ERα), which plays a key role in the process of hypertrophy of the prostate tissue. In order to compare ERα expression of the extract of *Curcumae radix* alone and the mixed extract of *Curcumae radix* and *Syzygii flos*, the experiment was performed along with the extract of *Curcumae radix* alone. As a result, it was confirmed that the ERα expression in the experimental group treated with the mixed extract (BPH+UM-002 group) was inhibited by 72% based on the benign prostatic hyperplasia-induced disease control group (BPH group), showing a significantly higher inhibition than that in the group treated with *Curcumae radix* alone extract (CR group; 45% inhibition) (FIG. 7).

Therefore, it was confirmed that the mixed extract consisting of *Curcumae radix* and *Syzygii flos* was effective in preventing or treating benign prostatic hyperplasia by inhibiting the expression of estrogen receptor α.

Figure 8:
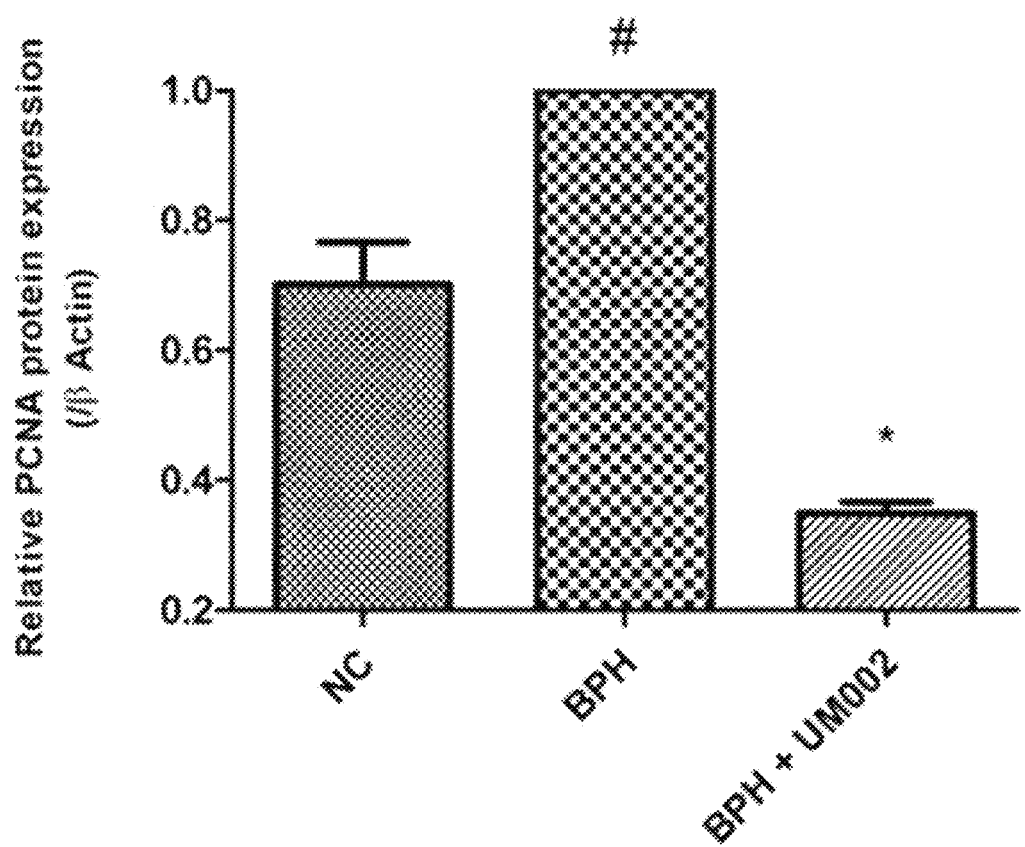
FIG. 8 illustrates the results of measuring the expression level of proliferating cell nuclear antigen (PCNA) in the prostate tissue of each group through Western blot (NC group: normal control group; BPH group: disease control group; BPH+UM-002 group: experimental group injected with mixed extracts of *Curcumae radix* and *Syzygii flos*).

Example 8. Effect of Inhibiting Proliferating Cell Nuclear Antigen (PCNA) Expression in Prostate Tissue by Mixed Extract The present inventors performed an experiment to confirm whether the mixed extract consisting of *Curcumae radix* and *Syzygii flos* inhibits the expression of proliferating cell nuclear antigen (PCNA), which plays a key role in the process of hypertrophy of the prostate tissue. As a result, it was confirmed that the PCNA expression in the experimental group treated with the mixed extract (BPH+UM-002 group) was inhibited by 65% based on the benign prostatic hyperplasia-induced disease control group (BPH group) (FIG. 8).

Therefore, it was confirmed that the mixed extract consisting of *Curcumae radix* and *Syzygii flos* was effective in preventing or treating benign prostatic hyperplasia by inhibiting the expression of proliferating cell nuclear antigen.

Figure 9:
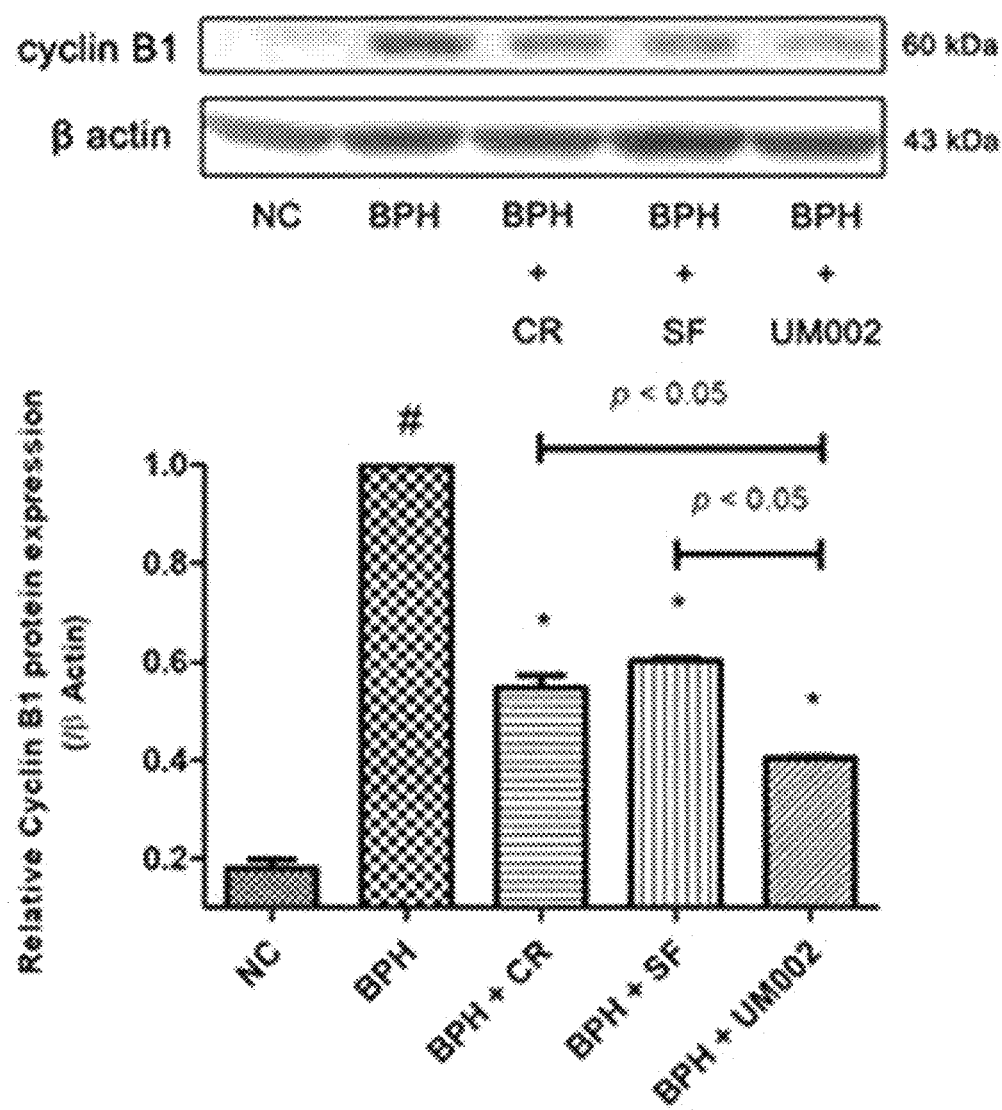
FIG. 9 illustrates the results of measuring the expression level of cyclin B1 in the prostate tissue of each group through Western blot (NC group: normal control group; BPH group: disease control group; BPH+CR group: experimental group injected with extracts of *Curcumae radix* alone; BPH+SF group: experimental group injected with extracts of *Syzygii flos* alone; and BPH+UM-002: experimental group injected with mixed extracts of *Curcumae radix* and *Syzygii flos*).

Example 9. Effect of Inhibiting Cyclin B1 Expression in Prostate Tissue by Mixed Extract The present inventors performed an experiment to confirm whether the mixed extract consisting of *Curcumae radix* and *Syzygii flos* inhibits the expression of cyclin B1, which plays a key role in the process of hypertrophy of the prostate tissue. As a result, it was confirmed that the cyclin B1 expression in the experimental group treated with the mixed extract (BPH+UM-002 group) was inhibited by 60% based on the benign prostatic hyperplasia-induced disease control group (BPH group) (FIG. 9).

Therefore, it was confirmed that the mixed extract consisting of *Curcumae radix* and *Syzygii flos* was effective in preventing or treating benign prostatic hyperplasia by inhibiting the expression of cyclin B1.

Figure 10:
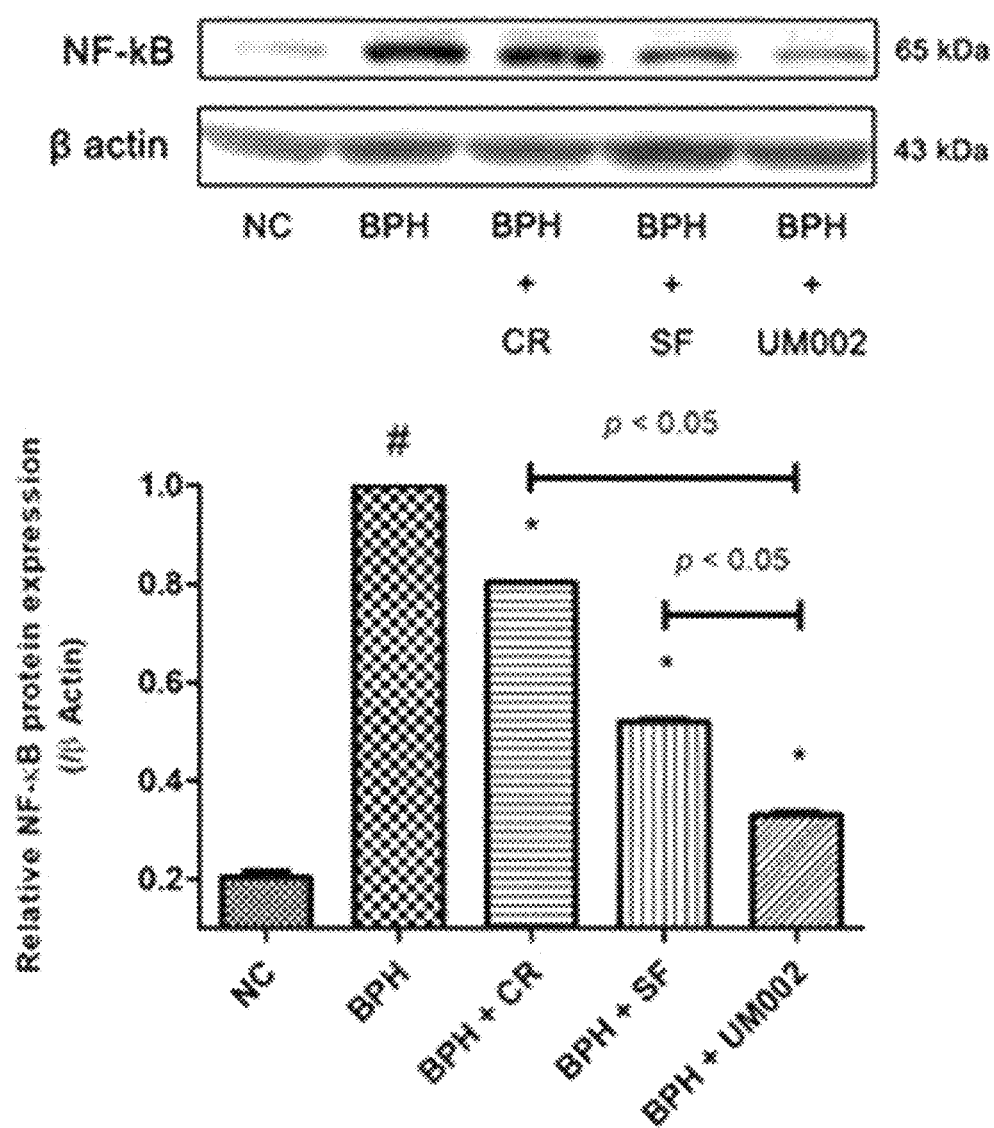
FIG. 10 illustrates the results of measuring the expression level of NF-κB in the prostate tissue of each group through Western blot (NC group: normal control group; BPH group: disease control group; BPH+CR group: experimental group injected with extracts of *Curcumae radix* alone; BPH+SF group: experimental group injected with extracts of *Syzygii flos* alone; and BPH+UM-002: experimental group injected with mixed extracts of *Curcumae radix* and *Syzygii flos*).

Example 10. Effect of Inhibiting NF-κB Expression in Prostate Tissue by Mixed Extract The present inventors performed an experiment to confirm whether the mixed extract consisting of *Curcumae radix* and *Syzygii flos* inhibits the expression of NF-κB, an inflammation-inducing factor. As a result, the expression of NF-κB in the prostate of BPH-induced rats with TP increased about 5.22 times compared to the prostate tissue of the NC group. This increase in NF-κB in the group treated with *Curcumae radix* alone (BPH+CR) was decreased by 20%, and that in the group treated with *Syzygii flos* alone (BPH+SF) was decreased by 48%. However, that in the group treated with mixed extract of *Curcumae radix* and *Syzygii flos* (BPH+UM-002) was decreased by 67% compared to BPH group. These values had statistical significance compared to the reduction rates of the groups treated with *Curcumae radix* alone and *Syzygii flos* alone (FIG. 10).

Therefore, it was confirmed that the mixed extract consisting of *Curcumae radix* and *Syzygii flos* was effective in Example 11. Comparison of Inhibitory Effects of
Finasteride, a Conventional Treatment, for Benign
Prostatic Hyperplasia-Related Factors, and a
Mixture of *Curcumae radix* and *Syzygii flos*

11.1. Comparison of Effect of Inhibiting DHT

Figure 11:
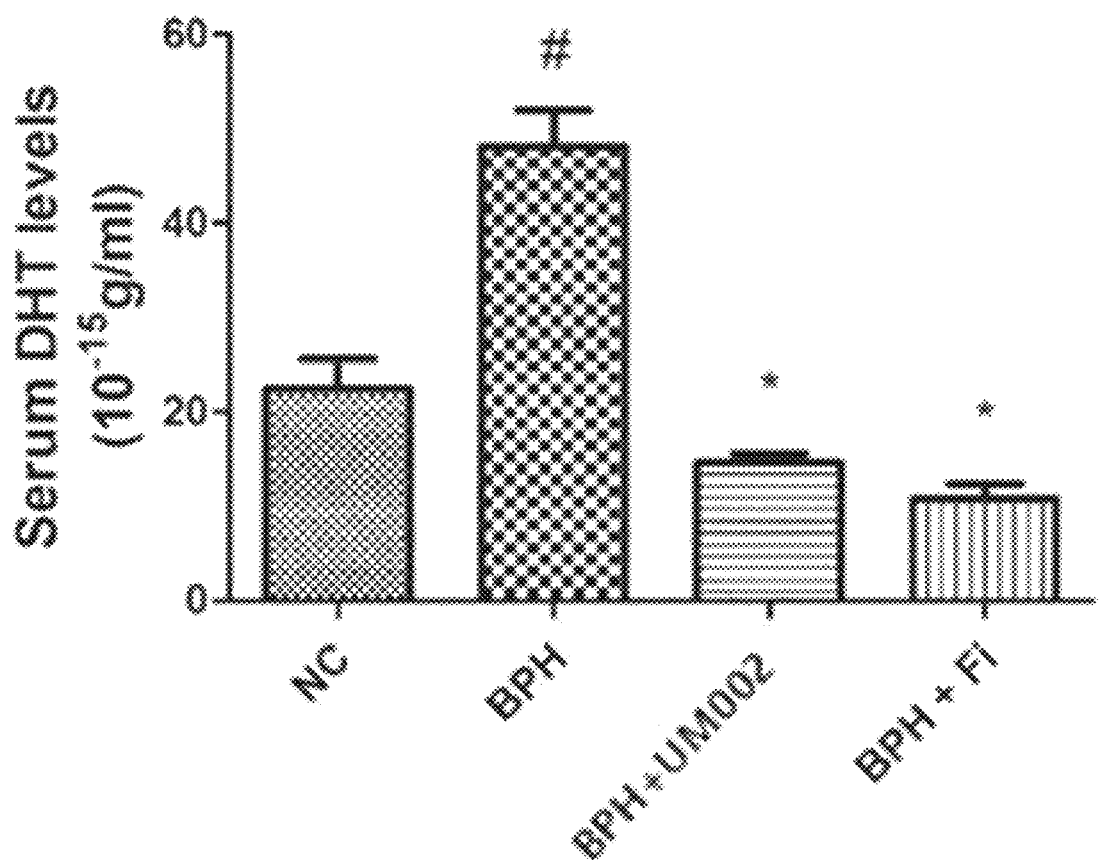
FIG. 11 illustrates the results of comparing the expression level of dihydrotestosterone (DHT) in the prostate tissue of the group injected with extracts of *Curcumae radix* and *Syzygii flos* and the group injected with finasteride through Western blot (NC group: normal control group; BPH group: disease control group; BPH+UM-002 group: experimental group injected with mixed extracts of *Curcumae radix* and *Syzygii flos*; and BPH+Fi group: positive control group).

The present inventors compared the expression level of DHT in a mixed extract consisting of *Curcumae radix* and *Syzygii flos* compared to finasteride, a conventional treatment for benign prostatic hyperplasia. As a result, it was confirmed that the expression of DHT in the experimental group treated with the mixed extract (BPH+UM-002 group) was inhibited by 71% based on the benign prostatic hyperplasia-induced disease control group (BPH group), and that in the finasteride-treated group was inhibited by 77% (FIG. 11).

Therefore, it was confirmed that the mixed extract consisting of *Curcumae radix* and *Syzygii flos* inhibited the expression of DHT to a similar level compared to finasteride, a conventional treatment for benign prostatic hyperplasia.

11.2. Comparison of Effect of Inhibiting PSA

Figure 12:
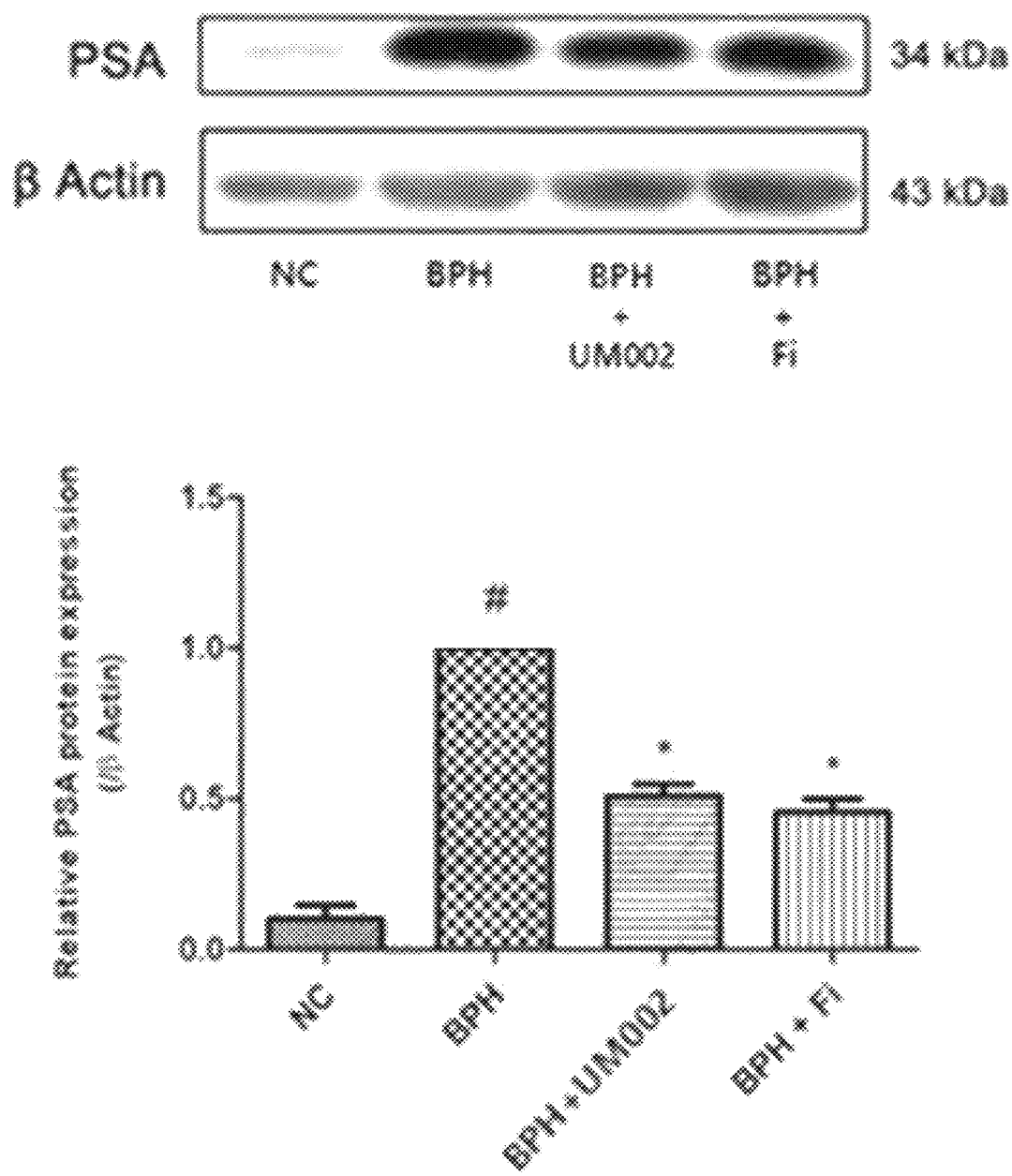
FIG. 12 illustrates the results of comparing the expression levels of prostate specific antigen (PSA) in the prostate tissue of the group injected with extracts of *Curcumae radix* and *Syzygii flos* and the group injected with finasteride through Western blot (NC group: normal control group; BPH group: disease control group; BPH+UM-002 group: experimental group injected with mixed extracts of *Curcumae radix* and *Syzygii flos*; and BPH+Fi group: positive control group).
Figure 13:
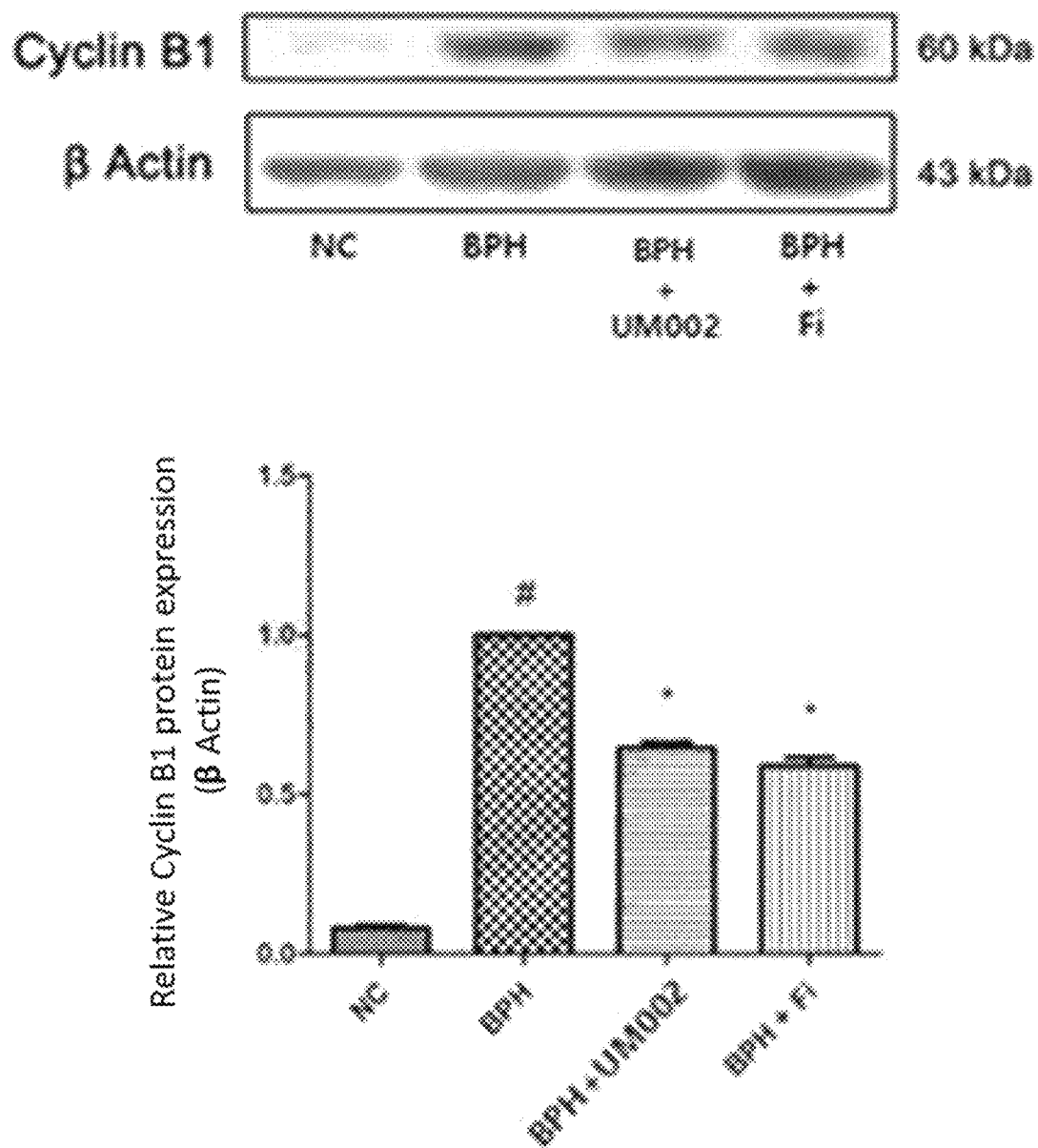
FIG. 13 illustrates the results of comparing the expression levels of androgen receptor (AR) in the prostate tissue of the group injected with extracts of *Curcumae radix* and *Syzygii flos* and the group injected with finasteride through Western blot (NC group: normal control group; BPH group: disease control group; BPH+UM-002 group: experimental group injected with mixed extracts of *Curcumae radix* and *Syzygii flos*; and BPH+Fi group: positive control group).

The present inventors compared the expression level of PSA in a mixed extract consisting of *Curcumae radix* and *Syzygii flos* compared to finasteride, a conventional treatment for benign prostatic hyperplasia. As a result, it was confirmed that the expression of PSA in the experimental group treated with the mixed extract (BPH+UM-002 group) was inhibited by 49% based on the benign prostatic hyperplasia-induced disease control group (BPH group), and that in the finasteride-treated group was inhibited by 55% (FIG. 12).

Therefore, it was confirmed that the mixed extract consisting of *Curcumae radix* and *Syzygii flos* inhibited the expression of PSA to a similar level compared to finasteride, a conventional treatment for benign prostatic hyperplasia.

11.3. Comparison of Effect of Inhibiting AR

The present inventors compared the expression level of AR in a mixed extract consisting of *Curcumae radix* and *Syzygii flos* compared to finasteride, a conventional treatment for benign prostatic hyperplasia. As a result, it was confirmed that the expression of AR in the experimental group treated with the mixed extract (BPH+UM-002 group) was inhibited by 81% based on the benign prostatic hyperplasia-induced disease control group (BPH group), and that in the finasteride-treated group was inhibited by 54% (FIG. 113).

Therefore, it was confirmed that the mixed extract consisting of *Curcumae radix* and *Syzygii flos* inhibited the expression of AR to a higher level compared to finasteride, a conventional treatment for benign prostatic hyperplasia.

11.4. Comparison of Effect of Inhibiting PCNA

Figure 14:
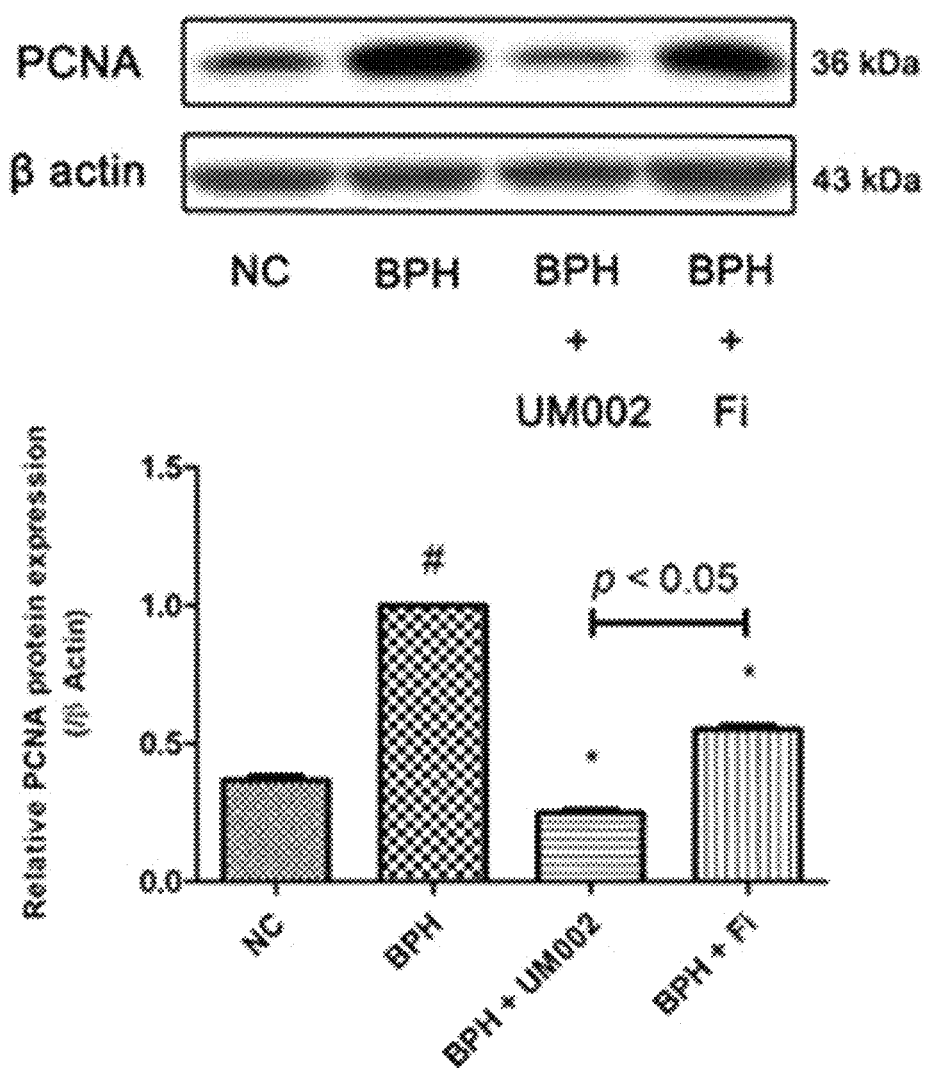
FIG. 14 illustrates the results of comparing the expression levels of proliferating cell nuclear antigen (PCNA) in the prostate tissue of the group injected with extracts of *Curcumae radix* and *Syzygii flos* and the group injected with finasteride through Western blot (NC group: normal control group; BPH group: disease control group; BPH+UM-002 group: experimental group injected with mixed extracts of *Curcumae radix* and *Syzygii flos*; and BPH+Fi group: positive control group).

The present inventors compared the expression level of PCNA in a mixed extract consisting of *Curcumae radix* and *Syzygii flos* compared to finasteride, a conventional treatment for benign prostatic hyperplasia. As a result, it was confirmed that the expression of PCNA in the experimental group treated with the mixed extract (BPH+UM-002 group) was inhibited by 75% based on the benign prostatic hyperplasia-induced disease control group (BPH group), and that in the finasteride-treated group was inhibited by 45% (FIG. 14).

Therefore, it was confirmed that the mixed extract consisting of *Curcumae radix* and *Syzygii flos* inhibited the expression of PCNA to a higher level compared to finasteride, a conventional treatment for benign prostatic hyperplasia.

11.5. Comparison of Effect of Inhibiting Cyclin B1

The present inventors compared the expression level of cyclin B1 in a mixed extract consisting of *Curcumae radix* and *Syzygii flos* compared to finasteride, a conventional treatment for benign prostatic hyperplasia. As a result, it was confirmed that the expression of cyclin B1 in the experimental group treated with the mixed extract (BPH+UM-002 group) was inhibited by 36% based on the benign prostatic hyperplasia-induced disease control group (BPH group), and that in the finasteride-treated group was inhibited by 41% (FIG. 15).

Therefore, it was confirmed that the mixed extract consisting of *Curcumae radix* and *Syzygii flos* inhibited the expression of cyclin B1 to a similar level compared to finasteride, a conventional treatment for benign prostatic hyperplasia.

Example 12. Side Effect Alleviation Effect of
Mixed Extract of *Curcumae radix* and *Syzygii flos*
on Side Effects and Toxicity of Finasteride, a
Conventional Treatment 12.1. Comparison of Effects on Plasma Alanine Transaminase (AST) and Creatinine The present inventors compared the expression levels of AST, a liver toxin index, and creatinine, a renal toxicity level in order to compare the known side effects of a mixed extract consisting of *Curcumae radix* and *Syzygii flos* to finasteride, a conventional treatment for benign prostatic hyperplasia and to confirm the evaluation of potential side effects of *Curcumae radix* and *Syzygii flos*, which are known to be opposite.

As a result, it was confirmed that the expression of AST was rather increased in the group treated with *Curcumae radix* alone (BPH+CR group) compared to the control group and the BPH group. On the other hand, it was confirmed that the expression of AST was reduced in the experimental group treated with the mixed extract (BPH+UM-002 group) compared to the group treated with *Curcumae radix* alone (BPH+CR group), the group treated with *Syzygii flos* alone (BPH+SF group) and the group treated with finasteride (BPH+Fi group) (FIG. 16).

Further, it was confirmed that the expression of creatinine was significantly reduced in the experimental group treated with the mixed extract (BPH+UM-002 group) compared to the group treated with *Curcumae radix* alone (BPH+CR group), the group treated with *Syzygii flos* alone (BPH+SF group) and the group treated with finasteride (BPH+Fi group) (FIG. 16).

Therefore, it was confirmed that the mixed extract of the present invention did not inhibit the expressions of AST and creatinine compared to the positive control group or the single substance-treatment group not to cause renal or hepatic toxicity. This suggests that the mixed extract of the present invention does not have potential side effects of *Curcumae radix* and *Syzygii flos*, which are known to have an opposite relationship and that it suppresses known side effects of finasteride.

12.2. Comparison of Effects on Sperm Count

Finasteride, which has been used conventionally, was effective for benign prostatic hyperplasia, but had a serious side effect of decreasing sperm count. Accordingly, the present inventors confirmed whether a mixed extract consisting of *Curcumae radix* and *Syzygii flos* affects sperm count.

In order to check the sperm count, after excision of the cauda epididymis of the SD rat group used in the above-mentioned Examples, it was cut into small pieces twice. Then, they were placed in 4 ml of PBS for 1 hour to allow the sperm to spread into the PBS solution. After mixing PBS containing sperm with the same amount of methanol, they were observed using a hematocytometer and an Olympus IX71 Research Inverted Phase microscope.

Figure 17:
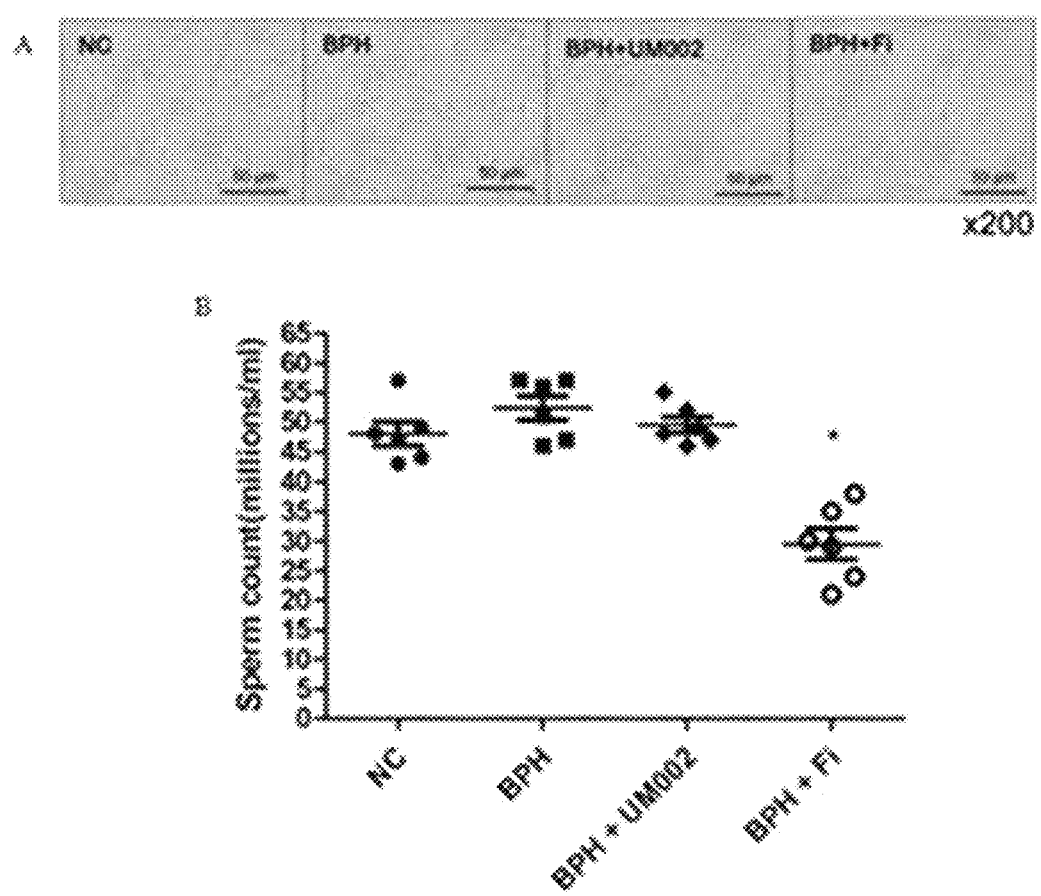
FIG. 17 illustrates the results of comparing the sperm count in the epididymis of the group injected with extracts of *Curcumae radix* and *Syzygii flos* and the group injected with finasteride (NC group: normal control group; BPH group: disease control group; BPH+UM-002 group: experimental group injected with mixed extracts of *Curcumae radix* and *Syzygii flos* and BPH+Fi group: positive control group; A: microscopic observation of sperm count; B: graph of sperm count).

As a result, the sperm count in the experimental group treated with the mixed extract (BPH+UM-002 group) was 94% compared to the control group, NC group, whereas the sperm count in the group treated with finasteride was reduced to 56% level compared to that of the NC group (FIG. 17).

Therefore, it was confirmed that the mixed extract of the present invention showed an effect on benign prostatic hyperplasia without reducing the sperm count, compared to finasteride, which is a conventional treatment for benign prostatic hyperplasia.

Therefore, it was confirmed that a synergistic effect was caused such that the mixed extract of *Curcumae radix* and *Syzygii flos* according to the present invention effectively inhibits DHT, AR, PSA, ERα, PCNA, cyclin B1 and NF-κB, factors related to benign prostatic hyperplasia, even when drugs having an opposite relationship are used. In addition, the effect of alleviating potential side effects caused by the mixing of *Curcumae radix* and *Syzygii flos*, which have opposites relationship, and toxic side effects of finasteride, a conventionally used treatment for benign prostatic hyperplasia was confirmed. As a result, it was confirmed that the expressions of AST, a liver toxin factor, and creatinine, a renal toxin factor were inhibited not to cause side effects. In addition, the side effects of finasteride such as the reduction of sperm counts were alleviated so that it did not affect the decrease in sperm count, indicating that there is the effect of alleviating the side effects and toxicity of the finasteride. Therefore, it was confirmed that the mixed extract of *Curcumae radix* and *Syzygii flos* of the present invention may be used as an effective treatment for benign prostatic hyperplasia.

The invention claimed is:

1. A method for treating benign prostatic hyperplasia, the method comprising:
   administering a pharmaceutically effective amount of a pharmaceutical composition comprising an active ingredient consisting of a mixed extract of *Curcumae radix* and *Syzygii flos* to a subject in need thereof,
   wherein the sole active ingredient of the pharmaceutical composition is the mixed extract,
   wherein the mixed extract is characterized in that *Curcumae radix* and *Syzygii flos* are extracted after mixing in a weight ratio of 0.1 to 10:0.1 to 10, and
   wherein the subject requires inhibiting expression of one or more factors selected from the group consisting of dihydrotestosterone, androgen receptor, prostate specific antigen, estrogen receptor α, proliferating cell nuclear antigen (PCNA), cyclin B1 and nuclear factor kappa B (nuclear factor kappa-light-chain-enhancer of activated B cells, NF-κB).

2. The method of claim 1, wherein the subject requires inhibiting expression of alanine transaminase (AST), a liver toxin factor, and creatinine, a renal toxin factor.

3. The method of claim 1, wherein the mixed extract does not reduce sperm counts in epididymis.

* * * * *